United States Patent
Fayyad et al.

(10) Patent No.: US 8,978,453 B2
(45) Date of Patent: Mar. 17, 2015

(54) CRANK SIGNAL ERROR DETECTION USING A CAM SIGNAL INTERVAL

(75) Inventors: Salem Ahmad Fayyad, Grand Blanc, MI (US); Andy Tenka, Ypsilanti, MI (US); Sergio Quelhas, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 530 days.

(21) Appl. No.: 13/445,471

(22) Filed: Apr. 12, 2012

(65) Prior Publication Data

US 2013/0269415 A1    Oct. 17, 2013

(51) Int. Cl.
  *G01M 15/00*  (2006.01)
  *G01M 15/06*  (2006.01)
(52) U.S. Cl.
  CPC .................. *G01M 15/06* (2013.01)
  USPC ........................................ 73/114.01

(58) Field of Classification Search
  None
  See application file for complete search history.

(56) References Cited

U.S. PATENT DOCUMENTS

| 7,197,391 B2 | 3/2007 | Kunibe et al. |
| 7,428,459 B2 | 9/2008 | Kondo |
| 2009/0265079 A1 | 10/2009 | Kondo |

*Primary Examiner* — Robert R Raevis
(74) *Attorney, Agent, or Firm* — Lawrence D. Hazelton

(57) ABSTRACT

A method of detecting a crank signal error that includes incrementing a crank tooth counter in response to detecting a crank signal, comparing the crank tooth counter to an expected value when a cam signal is detected, and indicating a crank signal error if the crank tooth counter is not substantially equal to the expected value. This method is advantageous because a cam interval used to determine when to start and stop counting crank tooth pulses is automatically adjusted for variations in engine speed, while the prior art time based methods must adjust the time interval for variations in engine speed.

6 Claims, 3 Drawing Sheets

CRANK SIGNAL ERROR DETECTION USING A CAM SIGNAL INTERVAL

TECHNICAL FIELD OF INVENTION

This disclosure generally relates to detecting a crank signal error, and more particularly relates to using a cam signal to determine an interval for incrementing a crank tooth counter, and comparing the crank tooth counter to an expected value.

BACKGROUND OF INVENTION

It is known to control an internal combustion engine based on a signal from a crank sensor or crank position sensor in order to properly time engine control events such as fuel injector timing and spark ignition timing. A common way to determine crank position is to equip the engine with a 58-tooth crank wheel, and a crank sensor configured to detect when a tooth of the crank wheel passes by the sensor and output a corresponding crank signal. The crank signal is typically monitored by an engine control unit (ECU), and used by the ECU to operate, for example, a fuel injector or an ignition module.

If the crank sensor becomes damaged, or the crank signal received by the ECU becomes inaccurate or unreliable, the ECU should to be configured to determine that there is a problem with the crank signal. United States Patent Application Publication Number 2009/0265079 published Oct. 22, 2009 by Kondo and assigned to Denso Corporation describes a way to detect a problem with the crank signal if the time interval between successive crank pulses is excessive. However, such a time based approach is problematic because it may not detect an occasional missing pulse, and so may not be able to detect an intermittent crank signal.

SUMMARY OF THE INVENTION

In accordance with one embodiment, a method of detecting a crank signal error is provided. The method includes incrementing a crank tooth counter in response to detecting a crank signal. The method also includes comparing the crank tooth counter to an expected value when a cam signal is detected. The method also includes indicating a crank signal error if the crank tooth counter is not substantially equal to the expected value.

In another embodiment, the cam signal is used to determine a cam interval for incrementing the crank tooth counter.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
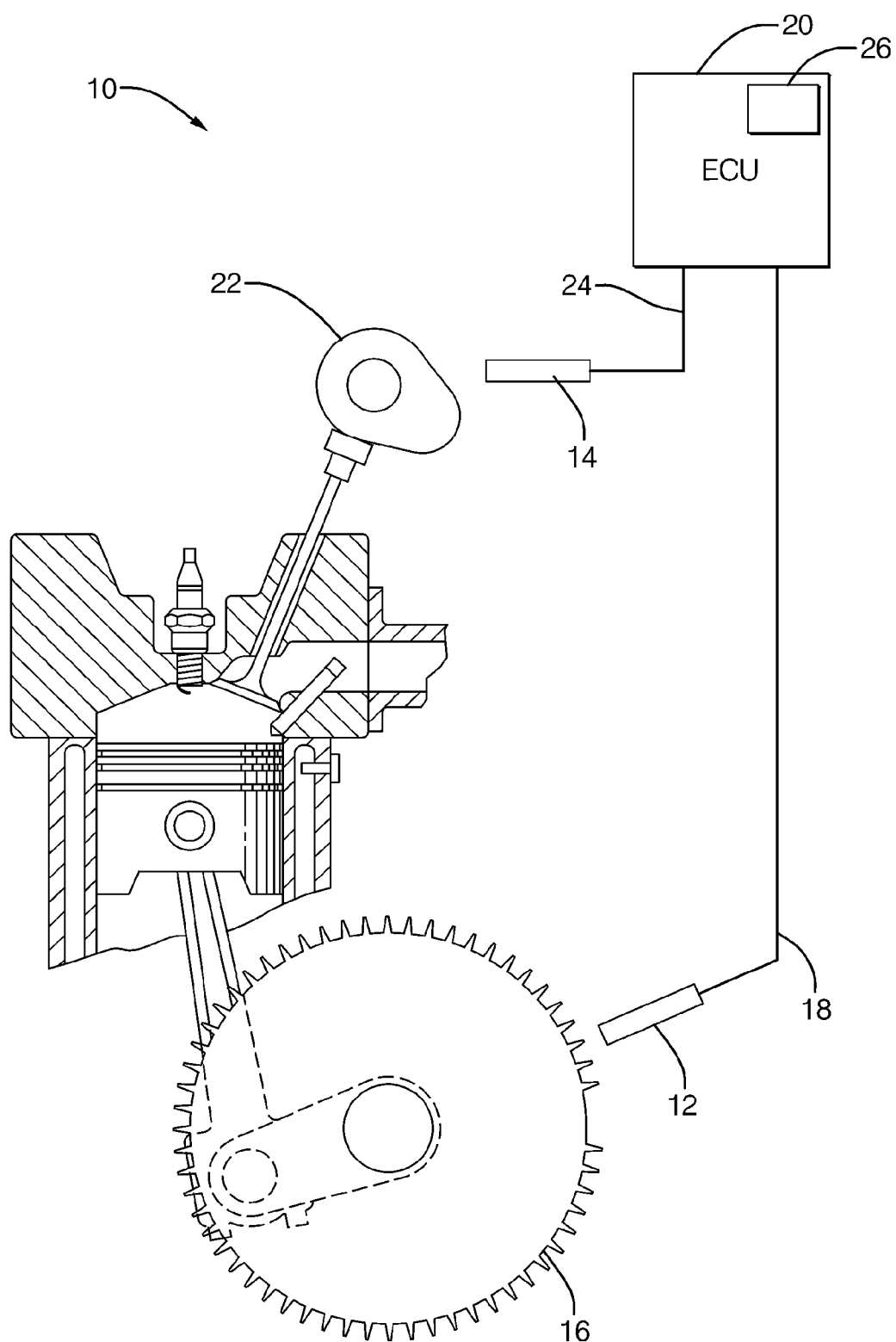
FIG. 1 is a diagram of an engine equipped with an engine control unit configured to detect a crank signal error in accordance with one embodiment.

FIG. 1 illustrates a non-limiting example of an engine 10 equipped with a crank sensor 12 and a cam sensor 14. The engine 10 is illustrated as a single cylinder engine, however it will be appreciated that the teachings herein are applicable to engines with any number of cylinders. The engine 10 may be equipped with a fifty-eight (58) tooth crank wheel 16. As is commonly known, the fifty-eight teeth are located about every six (6) degrees about the perimeter of the crank wheel 16, and so there is a gap created by a missing fifty-ninth and sixtieth tooth.

The crank sensor 12 is preferably positioned relative to the crank wheel so that the crank sensor 12 outputs a crank signal 18 to an engine control unit (ECU) 20 indicative of a tooth of the crank wheel 16 passing by the crank sensor 12. Typically, the ECU 20 uses the crank signal 18 to determine when to perform certain engine control events such as operating a fuel injector (not shown) or spark plug (not shown). The crank signal 18 may be a series of square pulses, each pulse corresponding to a single tooth, or may be a sinusoidal type signal that is typically post processed by the ECU 20 to be converted into a square type waveform.

The engine 10 typically includes a cam 22 that rotates once for every two revolutions of the crank wheel 16. The cam 22 is preferably configured with features so that the cam sensor 14 can sense rotation of the cam 22. By way of example and not limitation, the arrangement of the cam 22 and cam sensor 14 may be configured to output a cam signal 24 that provides a pulse for every one-hundred-twenty (120) degrees of rotation by the cam 22. As such, for this non-limiting example, the crank signal 18 will indicate the passing of forty (40) teeth between a rising edge of two subsequent pulses in the cam signal 24, unless the interval between the two cam signal pulses is one that includes the missing fifty-ninth and sixtieth teeth gap described above. It is recognized that some engines have more than one cam, and it should be apparent that the teachings presented herein are applicable to those engines. In particular, if the ECU 20 receives signal from multiple cam sensors, the ECU may be configured to logically OR the signals to form a single cam signal for use as described herein.

The ECU 20 may include a processor 26 such as a microprocessor or other control circuitry as should be evident to those in the art. The ECU 20 may include memory, including non-volatile memory, such as electrically erasable programmable read-only memory (EEPROM) for storing one or more routines, thresholds and captured data. The one or more routines may be executed by the processor to perform steps for determining if the crank signal 18 received by the ECU 20 is abnormal or indicates an error in the crank signal 18 as described herein.

Figure 2:
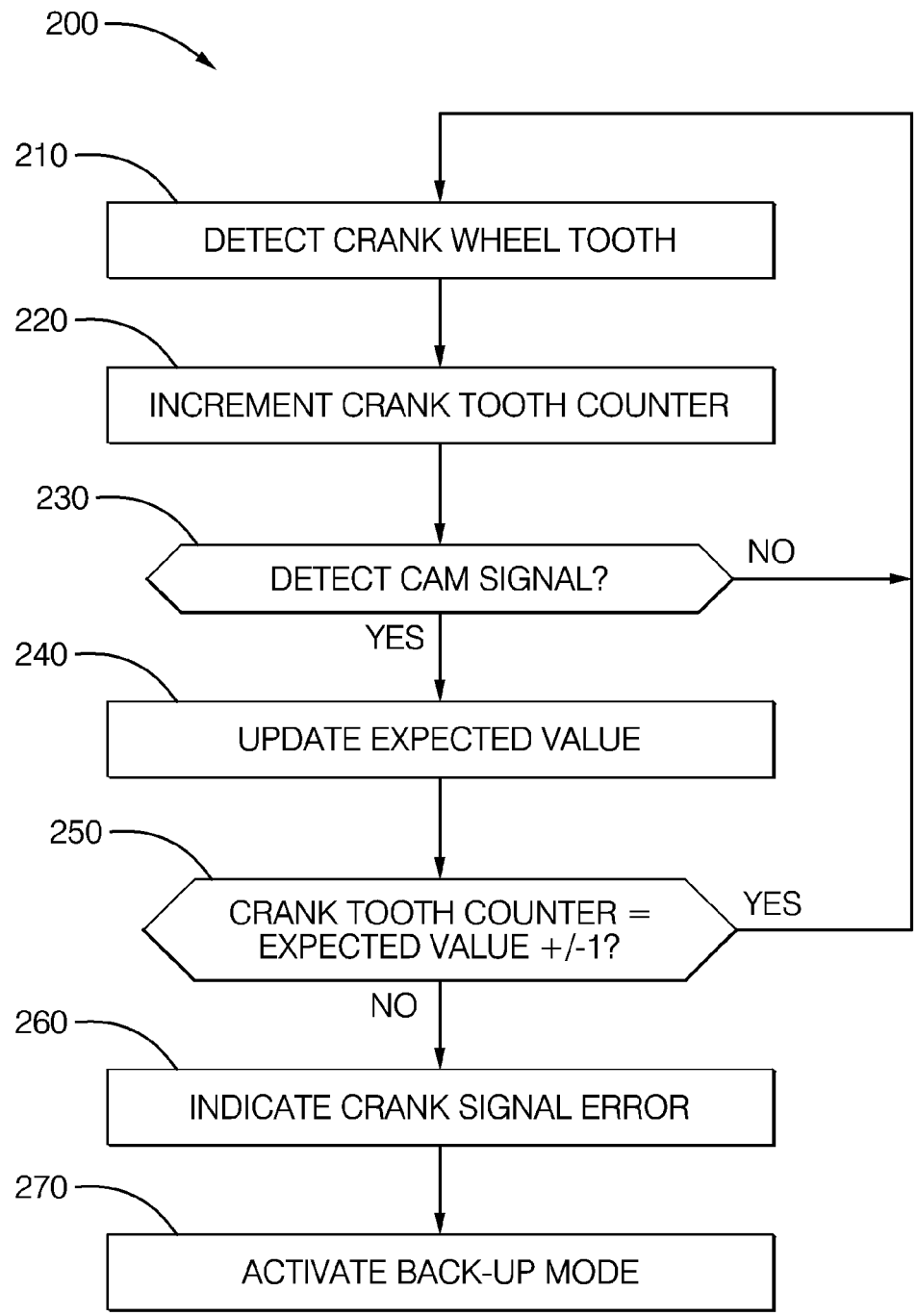
FIG. 2 is a flowchart of a method of detecting a crank signal error performed by the engine control unit of FIG. 1 in accordance with one embodiment.
Figure 3:
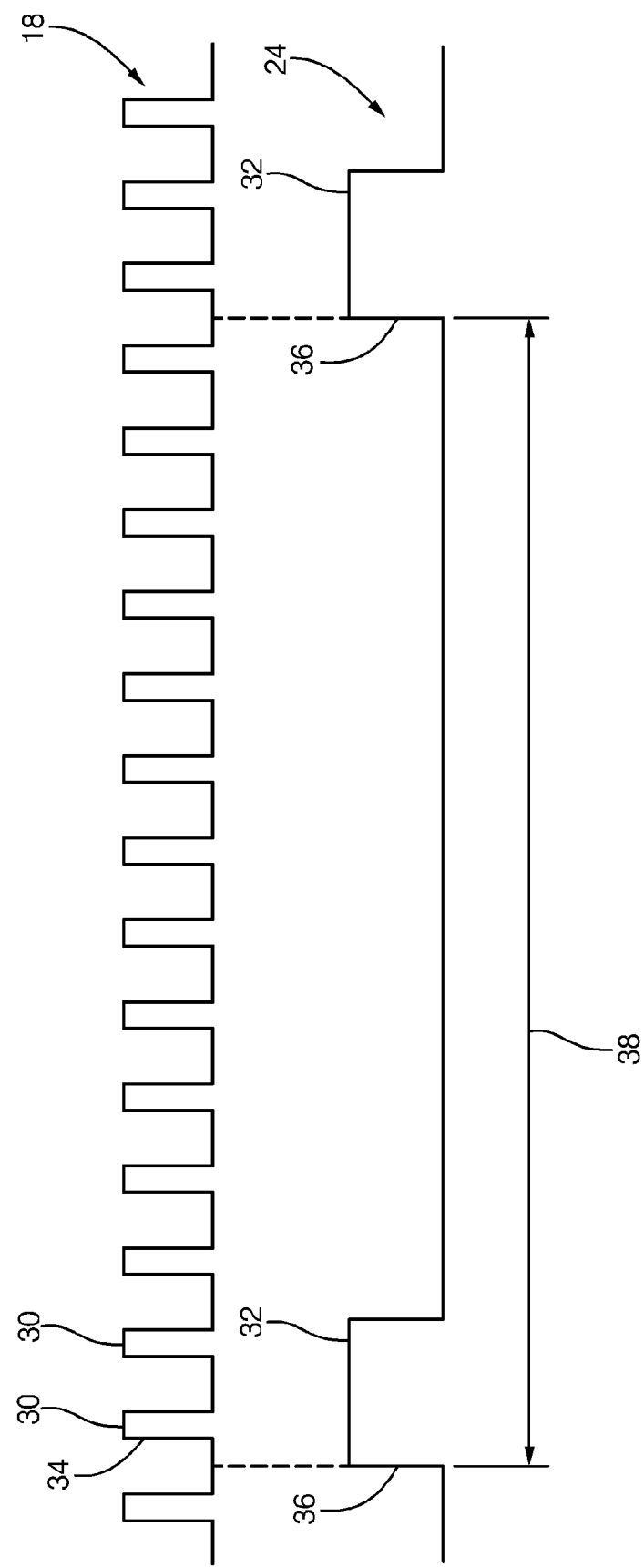
FIG. 3 is graph of signals received by the engine control unit of FIG. 1 in accordance with one embodiment.

FIG. 2 illustrates a non-limiting example of a method 200 may executed by the ECU 20. In general, method 200 is a way to determine a crank signal error or abnormal crank signal 18 by counting the number of crank wheel tooth pulses 30 (FIG. 3) that occur between cam signal pulses 32, and then comparing that number to an expected value. If the number of crank wheel tooth pulses is too low, i.e. substantially lower than the expected value, it may be an indication that the crank sensor 12 is damaged and so is not outputting a corresponding crank signal 18 for each passage of a tooth on the crank wheel 18, or that the crank wheel 18 has been damaged, e.g. teeth have been broken off the crank wheel 16, or bent such that the crank sensor 12 is unable to detect the bent tooth. If the number of crank wheel tooth pulses is too high, i.e. substantially higher than the expected value, it may be an indication that the electrical connection between the crank sensor 12 and the ECU 20 is intermittent, or that the crank signal 18 is being influenced by electromagnetic interference (EMI).

Step 210, DETECT CRANK WHEEL TOOTH, may include the ECU 20 filtering or otherwise processing the crank signal 18 so that the processor 26 is presented with a square wave where each pulse corresponds to a tooth on the crank wheel 16. If a crank wheel tooth is detected by, for example detecting a rising edge 34 of the square wave forming the crank signal 18, the method 200 proceeds to step 220.

Step 220, INCREMENT CRANK TOOTH COUNTER, may include incrementing a value of a variable stored by the processor 26 in response to each time a crank wheel tooth is detected.

Step 230, DETECT CAM SIGNAL?, may include detecting a rising edge of the cam pulse 32 of the cam signal 24. If a rising edge is not immediately detected, the method 200 may return to step 210 via the NO logic path to look for another tooth pulse 30. If a rising edge is detected or has been recently detected, the method 200 may proceed via the YES logic path to step 240. It is recognized that there are many other suitable ways to perform steps to count the number of tooth pulses 30 between the cam pulses 32, and the steps presented are a non-limiting example of one way to accomplish that task.

Step 240, UPDATE EXPECTED VALUE, is an optional step that may be used to keep track of repeated instances of an apparent missing tooth pulse 30. For example, if a particular cam interval 38 repeatedly has the same less than expected tooth pulse count, it may be an indication that one or more teeth are missing or damaged, and so the expected value for that particular cam interval may be updated in the ECU. As such, for this example, the expected value may be based on a previous counter value. Alternatively, the expected value may simply be based on a predetermined value stored in memory so that any instance of a damaged or missing tooth may treated as an issue that warrants some sort of repair to the engine 10.

Step 250, CRANK TOOTH COUNTER=EXPECTED VALUE +/−1?, may include comparing the crank tooth counter to an expected value when a cam signal 24, e.g. a cam pulse 32 or rising edge 36, is detected. In this non-limiting example, a variation in crank tooth count of plus or minus one tooth pulse may be tolerated. It is recognized that it may be preferable in some instances to require that the crank tooth counter equal the expected value exactly, for example during laboratory testing of the vehicle. It is also recognized that it may be preferable to allow a greater range of tolerance, e.g. plus or minus three tooth pulses if other remedial engine control algorithms are available that accommodate such variation. In general, step 250 indicates a crank signal error if the crank tooth counter is not substantially equal to the expected value. As used herein, substantially equal means within whatever limits can be tolerated by the ECU and still operate the engine. It should be understood that these limits are generally determined by empirical testing or may be determined based on a mathematical model of the engine. If the crank tooth counter is substantially equal to the expected value, the method 200 returns to step 210 via the YES logic path where the crank tooth counter may be reset in preparation to count tooth pulses 30 until the next cam pulse 32 is detected. If the crank tooth counter is not substantially equal to the expected value, the method 200 proceeds to step 260.

Step 260, INDICATE CRANK SIGNAL ERROR, may include activating a 'SERVICE ENGINE SOON' message to an operator of a vehicle using the engine 10, or the indication may include setting a flag in the processor 26 that causes the ECU 20 to execute optional step 270.

Step 270, ACTIVATE BACK-UP MODE, may be executed if a crank signal error has been detected. By way of example, the back-up mode may include the ECU ignoring the crank signal and scheduling all engine control events base on the cam signal 24, the details of which are disclosed in United States Patent Application Publication Number 2009/0265079 published Oct. 22, 2009 by Kondo and assigned to Denso Corporation, the entire contents of which are hereby incorporated by reference herein.

Accordingly, a method 200 of detecting a crank signal error is provided. This cam signal interval based method of detecting a crank signal error is an alternative to the time interval based methods suggested in the prior art. This method is advantageous because the cam interval 38 is automatically adjusted for variations in engine speed, while the prior art time based methods must adjust the time interval for variations in engine speed.

While this invention has been described in terms of the preferred embodiments thereof, it is not intended to be so limited, but rather only to the extent set forth in the claims that follow.

We claim:

1. A method of detecting a crank signal error, said method comprising:
   incrementing a crank tooth counter in response to detecting a crank signal;
   comparing the crank tooth counter to an expected value when a cam signal is detected; and
   indicating a crank signal error if the crank tooth counter is not substantially equal to the expected value.

2. The method in accordance with claim 1, wherein the cam signal is used to determine a cam interval for incrementing the crank tooth counter.

3. The method in accordance with claim 1, wherein the method further comprises activating a back-up mode if a crank signal error has been detected.

4. The method in accordance with claim 1, wherein the expected value is based on a previous counter value.

5. The method in accordance with claim 1, wherein the expected value is based on a predetermined value.

6. An engine control unit configured to perform the steps of claim 1.

* * * * *